United States Patent Office 2,927,822
Patented Mar. 8, 1960

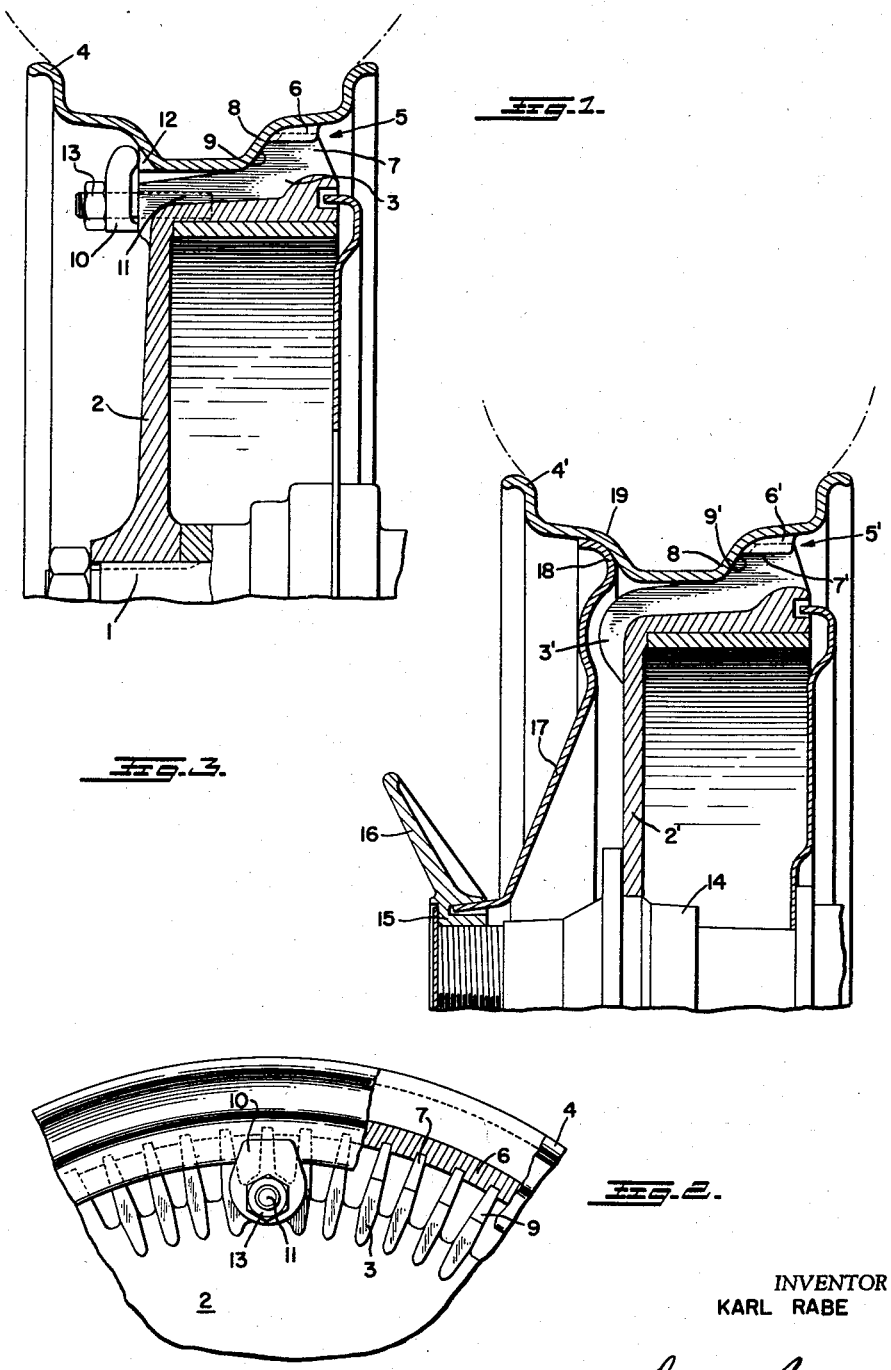

2,927,822

MOTOR VEHICLE WHEEL

Karl Rabe, Korntal, Wurttemberg, Germany, assignor to Firma Dr. Ing. h.c. F. Porsche K.G., Stuttgart-Zuffenhausen, Germany Application November 26, 1956, Serial No. 624,244

Claims priority, application Germany January 21, 1956

5 Claims. (Cl. 301—6)

The present invention relates to a motor vehicle which is provided with an arrangement for cooling the brakes, with fellies or wheel rims made of light-weight metal and with a brake drum having radially directed cooling fins or ribs.

Wheels for motor vehicles are known in the prior art which are formed of cast parts made in one piece and of light-weight metal, and which include the wheel rim and brake drum. The cooling of the drum takes place in such one-piece castings of the prior art by means of radially directed cooling fins or ribs which are effective as a blower rotor. However, such prior art constructions are disadvantageous in that during dismounting or removal of the wheels the brake drums are also taken off simultaneously therewith. The vehicle wheels, therefore, cannot be interchanged with each other because otherwise a reduction of the brake effect will take place as a result of uneven abutment of the brake shoes.

Furthermore, other prior art constructions are known which are formed by cast flat-base wheel rims which are supported on a wheel spider also formed as a separate casting, and are connected therewith by clamping means. In such a construction, the brake drum is formed as a separate part and is flangedly connected to the wheel spider. A multi-part and difficult assembly of the wheel results from the use of such a construction, i.e., a construction consisting of many separate parts rendering the assembly thereof difficult and time-consuming, so that such a construction is unsuitable for passenger motor vehicles.

According to the present invention, these disadvantages of prior art constructions are avoided in that the wheel rim is detachably connected with the brake drum by a toothed or keyed connection and is held securely in place by clamping or gripping members. By means of such a construction in accordance with the present invention, it is possible to safely secure the wheel rim to the remainder of the wheel with relatively few parts, and in which a separate wheel disk may also be dispensed with. As a result thereof, a reduction of the unsprung mass of the vehicle is simultaneously achieved thereby.

The toothed connection between the wheel rim and the brake drum is formed on the hub side thereof by means of the cooling ribs or fins of the brake drum. Consequently, a portion of the toothed connection consists thereby of members already normally present for purposes of cooling the brake so that a considerable simplification is obtained. The cooling fins or ribs forming the toothed connection are provided at the front side thereof, i.e., on the side thereof exposed to or facing the outside of the vehicle, with inclined surfaces corresponding to the contour of the rim bed which serve for purposes of abutment of the rim of the wheel. An accurate and exact alignment of the wheel is obtained by such a construction without any additional parts. The clamping members used for clamping the wheel rim to the brake drum are formed by clamping dogs or pawls arranged along the circumference of the brake drum which cooperate with the projections provided at the rim bed.

In motor vehicle wheels which are secured by wing-nuts of a central securing mechanism, the securing of the wheel takes place preferably by means of a tensioning disk connected with the wing nut. As a result of such a construction, the wheel simultaneously receives a protective covering.

Accordingly, it is an object of the present invention to provide a wheel assembly including rim and brake drum which enables facilitated assembly and disassembly of the wheel without the necessity of taking off the brake drum.

Another object of the present invention resides in the provision of a wheel construction for motor vehicles which results in a reduction of the unsprung mass of the vehicle.

A still further object of the present invention is a provision of such a construction of a vehicle wheel which avoids complicated, time-consuming, and relatively difficult manipulations in the exchange of wheels.

Another object of the present invention is to provide a wheel assembly made of relatively few parts which is particularly suitable for passenger vehicles.

A still further object of the present invention is the provision of a motor vehicle in which the wheel rim is secured to the brake drum in a simple yet reliable manner which simultaneously obviates the need for separate wheel disks.

A still further object of the present invention is the provision of such a wheel construction in which already existing parts used for purposes of cooling the brake are simultaneously used for purposes of securing together the wheel assembly.

Still another object of the present invention resides in an arrangement of a wheel which results in simplification of assembly and disassembly and in a construction which provides exact alignment of the parts.

These and other objects, features and advantages of the present invention will become more obvious from the following description when taken in connection with the accompanying drawing which shows, for purposes of illustration only, several embodiments in accordance with the present invention and wherein:

Figure 1 is a cross-sectional view through a motor vehicle wheel in accordance with the present invention, Figure 2 is a partial side view partially in cross-section, of the wheel construction of Figure 1, and Figure 3 is a cross-sectional view through a modified wheel construction in accordance with the present invention provided with a central securing mechanism.

Referring now to the drawing, wherein corresponding reference numerals designate corresponding parts, and more particularly to Figures 1 and 2, reference numeral 1 designates the drive shaft which is secured in any suitable known manner with a brake drum 2. The brake drum 2 is made of light-weight metal of any suitable type and is provided along the circumference thereof with radially directed cooling ribs or fins 3. A flat-base rim 4 which is also made of light-weight metal is connected with the brake drum 2 by a toothed connection generally designated by reference numeral 5. The toothed connection 5 is formed by two radially directed gear rims or toothed wheels 6 and 7 on the hub-side or inner side of the wheel. The gear rim 6 is formed in one piece with the wheel rim 4 while the gear rim 7 is constituted by the radially free ends of the cooling fins 3. The tooth pitch of the gears 6 and 7 are made so large that by the use of an appropriate casting process, such as, for example, by chill casting, permanent mold casting, injection or die casting, a machining of engaging parts thereof becomes unnecessary.

For purposes of alignment of the rim 4 relative to the drum assembly, ribs or fins 3 are provided with inclined surfaces 9 corresponding to the rim portion 8. The wheel assembly is secured in place in the axial direction by several tensioning dogs or pawls 10 distributed along the circumference thereof. Each tensioning dog or pawl 10 is supported on a threaded bolt 11 inserted and suitably secured in the brake drum 2 and supports itself against a projecting nose portion 12 of the wheel rim 4.

If the wheel and therewith the rim 4 is to be taken off or removed from the brake drum and wheel axle assembly 2, 1, then the nut 13 of each individual tensioning catch or dog 10 is loosened. The tensioning dogs 10 are thereupon rotated from the radially outwardly directed securing positions thereof whereby the wheel rim 4 together with any tire mounted thereon may be removed. The mounting of the wheel takes place appropriately in the reverse sequence.

Figure 3 illustrates a modification similar to the embodiment of Figure 1 in which like parts are indicated with like primed reference numerals. A brake drum 2' is secured on a wheel hub 14, the brake drum 2' being provided with radially directed cooling fins 3'. A flat-base wheel rim 4' is also connected with the brake drum 2' by means of a toothed connection generally designated by reference numeral 5' which consists of gear rims 6' and 7' on the hub-side or inner side of the wheel.

Since the connection between the rim 4' and the brake drum 2' takes place in the same manner as in Figure 1, a detailed description thereof is dispensed with herein.

The difference between the embodiment of Figure 3 and that of Figures 1 and 2 consists in that the axial securing of the wheel takes place through a central securing mechanism 15 by means of a wing nut 16. The wing nut 16 is connected for that purpose with a tensioning disk 17 which supports itself with the outer rim portion 18 thereof against the correspondingly shaped transitional portion 19 of the rim 4'. By tightening the nut 16, the inclined rim portion 8' of the rim 4' is forced against the inclined surfaces 9' of the cooling fins 3' and is thereby retained in the assembled and aligned position.

For purposes of disassembly of the wheel, the wing nut 16 is loosened and is taken off the hub 15 together with the tensioning disks 17. The wheel rim 4' may then be removed in any desired angular position with respect to the wheel axis. The tensioning disk 17 may be formed as decorative ring and may possibly also be provided with air intake pockets or apertures for the passage of cooling air for the brake drum cooling arrangement. The height of the cooling fins 3 or 3' is so selected in both embodiments that after deduction of the depth of the toothed connection of the gear rims 6, 7 or 6', 7' a sufficient blade or vane width remains available for purposes of supplying cooling air.

While I have shown and described two embodiments in accordance with the present invention, it is understood that the same is not limited thereto but is susceptible of many changes and modifications within the spirit of the present invention, and I intend to cover all such changes and modifications except as defined in the appended claims.

I claim:
1. A motor vehicle wheel comprising a brake drum in the form of a wheel center and provided at its outer periphery with radially extending cooling fins, a demountable rim fastened directly to the brake drum, clamping means acting axially of said drum to secure said rim to the drum, a tooth system interconnecting the brake drum and rim, said system comprising at the brake drum radial tooth-like tips of the cooling fins and mating tooth-receiving portions in a ring on the internal peripheral area of said rim, said tips being received in said mating portions when said rim is secured to the brake drum, said fins being so constructed and arranged as to circulate air axially of said wheel between the drum and the rim during rotation of the wheel.

2. A motor vehicle wheel made of light metal comprising a brake drum in the form of a wheel center and provided at its outer periphery with uniformly distributed axially extending cooling fins, a demountable rim fastened directly to the brake drum, and clamping means acting axially of said wheel for securing the rim to the drum, a tooth system interconnecting the brake drum and rim, said system comprising radially extending tips of said cooling fins and an internally toothed ring molded in the inner peripheral area of said rim and mating with said tips.

3. A motor vehicle wheel according to claim 2, wherein the rim has a base portion for supporting it on said drum, said cooling fins being provided with sloping surfaces facing the side at which the rim is mounted or removed, said sloping surfaces having a configuration like that of said base portion and engaging the latter for supporting the rim relative the drum.

4. A motor vehicle wheel according to claim 3 including projections at the rim base and wherein the clamping means comprise clamping pawls which are arranged at and spaced around the circumference of the brake drum and which act upon the projections provided at the rim base.

5. A motor vehicle wheel according to claim 2, said wheel being secured by a single nut of a central mechanism, and a coupling disk connected with said nut to clamp said rim to said drum.

References Cited in the file of this patent

UNITED STATES PATENTS

| | | |
|---|---|---|
| 1,906,737 | Burgess | May 2, 1933 |
| 2,274,503 | Reid | Feb. 24, 1942 |

FOREIGN PATENTS

| | | |
|---|---|---|
| 146,739 | Switzerland | July 16, 1931 |
| 379,091 | Great Britain | Aug. 25, 1932 |